CONTROLLED COOLING OF EXTENDED PLASTIC

Original Filed July 20, 1964 2 Sheets-Sheet 1

INVENTOR.
Jacob L. Luca
BY
Hill, Sherman, Meroni, Gross & Simpson
ATTORNEYS

CONTROLLED COOLING OF EXTENDED PLASTIC
Original Filed July 20, 1964 2 Sheets-Sheet 2
Fig. 3
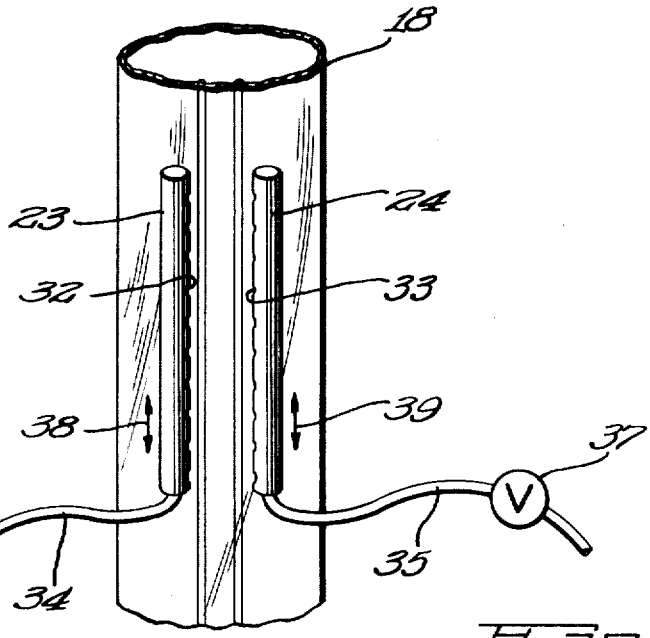
Fig. 2
Fig. 5
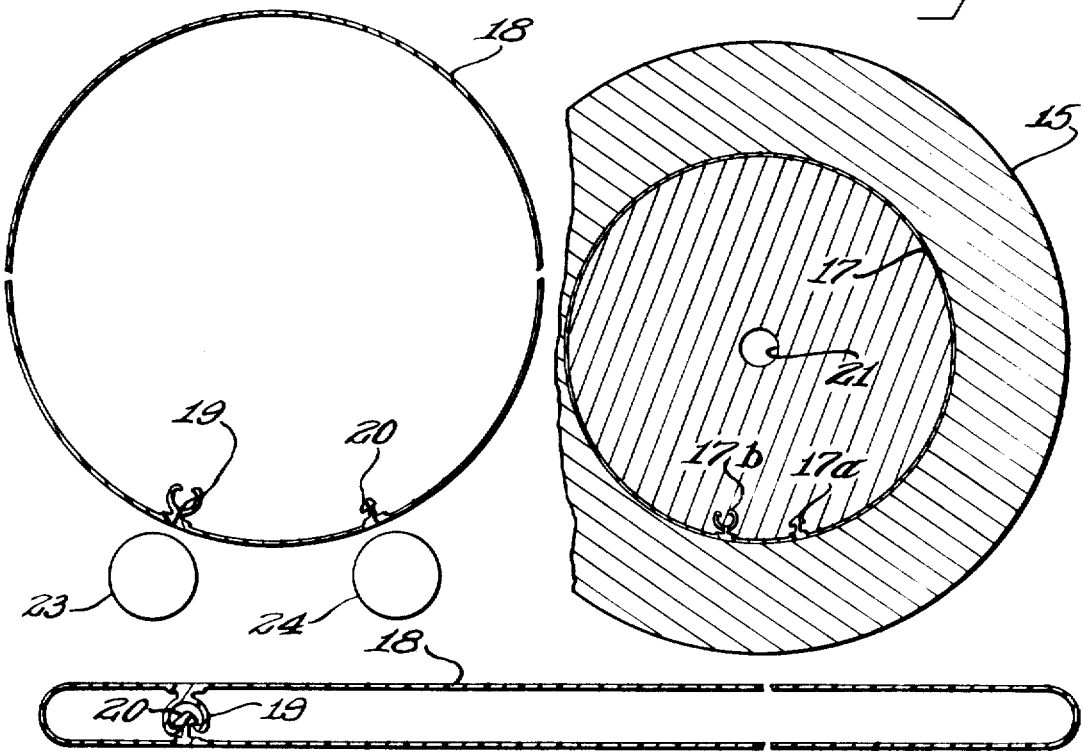
Fig. 4
INVENTOR.
Jacob L. Luca
BY
Hill, Sherman, Meroni, Gross & Simpson
ATTORNEYS United States Patent Office Re. 26,991
Reissued Nov. 24, 1970

26,991
CONTROLLED COOLING OF EXTRUDED PLASTIC

Jacob L. Luca, New York, N.Y., assignor, by mesne assignments, to Minigrip, Inc., New York, N.Y., a corporation of New York Original No. 3,320,340, dated May 16, 1967, Ser. No. 383,815, July 20, 1964. Application for reissue Apr. 10, 1968, Ser. No. 724,680
Int. Cl. B29c *25/00;* B29f *3/01*
U.S. Cl. 264—95 20 Claims

Matter enclosed in heavy brackets [ ] appears in the original patent but forms no part of this reissue specification; matter printed in italics indicates the additions made by reissue.

*ABSTRACT OF THE DISCLOSURE*

*A plastic extruder which comprises an extruding die that has a slot for extruding a thermoplastic and which is formed with an enlarged profile portion in a slot shape for forming pressure interlocking complementary rib and groove elements and having first cooling means cooling the film and second cooling means which cool specifically the rib and groove elements.*

Figure 1:
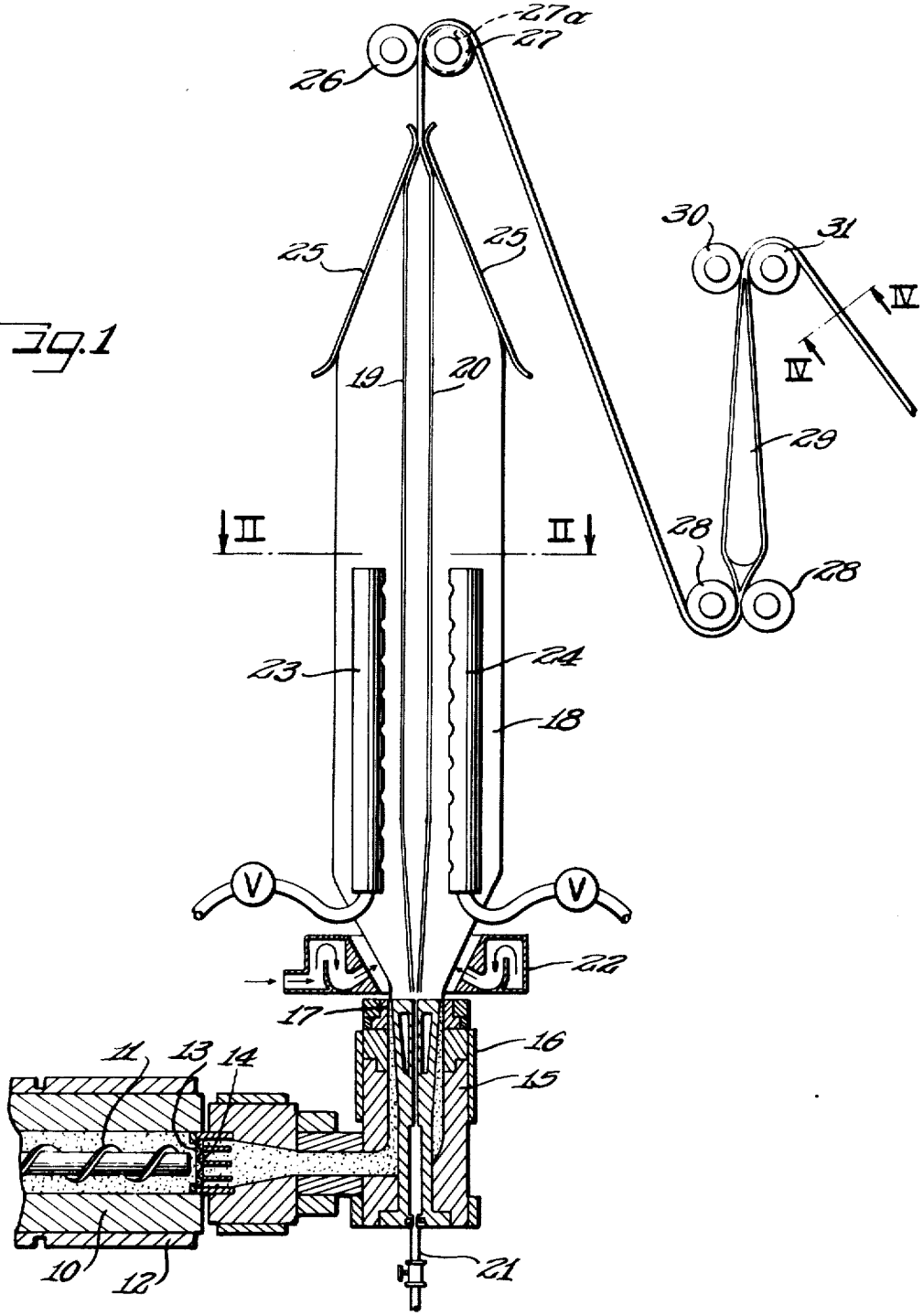

The present invention relates to improvements in plastic extruding mechanism and more particularly to a blown film plastic extruder for extruding a tube having interlocking rib and groove profiles thereon for making one piece plastic bags.

Plastic tubular film for making bags having integral pressure interlocking rib and groove elements thereon is shown in the copending application of Otto Karl Kraus, Ser. No. 176,926, filed Mar. 2, 1962, now Patent No. 3,235,331.

In the extrusion of tubular blown film, the extrudate is forced from an extruder means through an annular die opening and the inside of the extruded tube is pressurized to keep it from collapsing and to obtain cross grain orientation of the material. The material is drawn away from the die and flattened in pinch rolls and rolled on a wind up roll. The factors of extrusion and handling of the film are critical in the formation of a film having desired properties. The extrudate is maintained in a range of desirable temperatures and is controlled in the extruder and die from the original plasticating of the material until it emerges as film from the die. Generally the temperature of the thermoplastic or the melt may range up to about 400° F. in, for example, the extrusion of polyethylene. After emergence from the die, some little cooling of the blown bubble is effected by the pressurized air within the bubble although the primary cooling is effected by an annular air ring which directs the cooling air around the tube as it emerges from the die. The quality of the film is effected by the draw down rate at which the plastic is taken away from the die and the adjustment of the die opening and cooling air rate, and all factors are critical to the molecular orientation and eventual quality of the plastic.

In the formation of a one piece tubular film having integral interlocking rib and groove elements thereon, the plastic film has additional thickness at the location of the rib and groove elements and therefore the application of annular cooling to the film will leave the plastic forming the rib and groove elements at a higher temperature than the cooled film. The character and nature of the plastic which forms the rib and groove elements and particularly of the plastic immediately adjacent the rib and groove elements is important to the eventual strength of the bags which will be formed from the plastic tube. The uniform extrusion of the profiles without distortion thereof is also important so that the final rigid plastic rib and groove profile will have a coacting shape of maximum interlocking strength. Accordingly in extrusion of this film the blow up ratio, the frost line height (the cloudy line formed as the soft film begins to harden), the take off speed, and extruder output must be balanced to produce blown film wtth good physical properties and uniform gauge at an economical speed. In order to also obtain optimum formation of the interlocking profiles without affecting the above film qualities, their rate of cooling and the time when they are cooled must be carefully controlled. The profiles will then have optimum grain orientation, be extruded and stretched without unwanted deformation, and be sufficiently rigidified in adequate time for passing through the pinch rolls and in order to be interlocked.

It is accordingly an object of the present invention to provide an improved method and apparatus for extruding tubular film having integral rib and groove elements on the surface thereof.

A very important object of the invention is to increase the speed of production of the above described film.

It is another object of the invention to provide an improved method and apparatus for extruding blown film with interlocking rib and groove elements on the surface wherein the rib and groove elements are of improved properties and have improved strength relationship to the film.

A still further object of the invention is to provide a method and apparatus for producing extruded film with interlocking rib and groove element on the surface wherein extra heat from the thicker plastic of the rib and groove elements is removed by separate means to control the solidification of the plastic in said elements.

Other objects, advantages and features will become more apparent with the teaching of the principles of the invention in connection with the disclosure of the preferred embodiments thereof in the specification, claims and drawings, in which:

FIGURE 1 is a side elevational schematic view of an extruding mechanism constructed and operating in accordance with the principles of the present invention;

FIGUURE 2 is a horizontal sectional line taken substantially along line II—II of FIGURE 1;

FIGURE 3 is an enlarged detailed view showing the cooling mechanism for cooling the plastic of the rib and groove elements; and FIGURE 4 is a sectional view taken substantially along line IV—IV of FIGUURE 1.

As shown on the drawings:

As shown in FIGURE 1, plastic is extruded from an extruder cylinder 10 which may be provided with heaters 12 therearound and an extruder screw 11 therein. The melt passes through a breaker plate 13 and screen pack 14 to a die 15 which also may be surrounded with temperature control heaters.

The die 15 is provided with an annular opening 17 with rib and groove profiles 17a and 17b enlarged therefrom and projecting inwardly from the die slot 17. It will be recognized that in some arrangements additional profiles may be provided or the profiles may extend radially outwardly instead of inwardly.

The plastic tube is usually enlarged by air pressure therein supplied such as by a controlled air pressure line 21 leading through the center of the die to pressurize the inside of the tube. In some cases extrusion will be performed without enlarging or stretching the tube and the air pressure within the tube will be supplied only sufficient to maintain the walls of the tube in cylindrical form without expanding them, and in some cases the finished tube may even be slightly smaller than the circular die opening 17. For convenience, the description and drawings show the tube formed by a blown film process where the tube is expanded.

Some cooling occurs from the air within the tube although the principal heat removal is by means of one or two air rings 22 circumferentially surrounding and coaxial with the tube as it leaves the die opening. This ring blows a relatively high volume of low pressure air around the tube in a uniform manner to remove a uniform quantity of heat from the tube. For the film which is of uniform thickness uniform cooling is achieved but at the location of rib and groove elements 19 and 20, which are formed in the blow tube 18 at the location of the profiles 17a and 17b, the plastic is thicker and contains more heat and will remain at a higher temperature than the remainder of the film.

In order to remove the excess heat and solidify the plastic of the rib and groove elements 19 and 20, auxiliary cooling means are provided to blow separate jets of air at the tube at the locations of the rib and groove elements.

While in some instances it may be desirable to apply single jets of air to the profiles in the preferred arrangement, an elongated path of air is provided extending along parallel to the tube, and being provided by elongate pipes 23 and 24 with air jet openings therein as shown at 32 and 33 in FIGURE 3.

Although, in some arrangements, it may be preferred to provide the excess cooling air at the location of the ring 22; in the preferred arrangement the cooling air is applied to the rib and groove profiles 19 and 20 at a location following the ring. Since the rib and groove profiles 19 and 20 contain more plastic their resistance to cooling is greater. Therefore, since the remainder of the film is cooled uniformly by the air ring 22 its resistance to stretching will increase at a greater rate than the resistance of the plastic at the profile so that the cooling of the film will decrease its elasticity and more than compensate for the resistance to stretching provided by greater weight of plastic at the rib and groove profiles. Therefore, controlled and substantially uniform orientation of the plastic can be obtained by additional controlled cooling of the plastic at the location of the profile elements 19 and 20. This will increase the uniformity and reduce the distortion of the profile elements, and also improve the grain orientation and the strength of the film adjacent the profile elements as contrasted to an arrangement wherein only annular cooling means is applied.

By the time the plastic tube 18 is beyond the end of the cooling pipes 23 and 24, all of the plastic including that of the profiles 19 and 20 has been sufficiently solidified, and the plastic tube is channeled inwardly by guides 25 which provide a forming tent (and also which may be provided in the form of guide rolls) to direct the tube up between nip or pinch rolls 26 and 27. The pinch rolls are preferably formed of either rubber or stainless steel, or a combination thereof with the roll 26 possibly being of rubber and the roll 27 over which the flattened plastic is wrapped being of steel. The steel pinch roll is grooved so that if the profiles have not completely solidified they will not be damaged. The groove is shown at 27a.

The flattened film is then directed between guide rolls 28 to be wound onto a roll with means provided to align and interlock the rib and groove elements. An aligning mandrel 29 may be positioned floatingly inside of the tube as it passes the guide roll 28 and the tube is then pressed between pinch rolls 30 and 31 at which location sufficient pressure is applied to interlock the rib and groove elements. The flattened tube is then directed to a wind up mechanism, not shown.

As shown in FIGURES 2 and 3, the cooling pipes 23 and 24 are provided with rows of air jet openings 32 and 33 which are positioned to be directed immediately at the rib and groove elements. This provides an elongated stream of air continuously removing heat and cooling the plastic of the profile elements 19 and 20. The tubes may be mounted so as to be vertically adjustable as indicated schematically by the arrowed lines 38 and 39 to adjust the location at which the air is applied relative to the location of the annular cooling ring 22. The cooling rate may also be controlled by controlling the flow of air to the cooling pipes 23 and 24 through the supply lines 34 and 35 which are provided with air flow control valves 36 and 37. The valves can also be individually regulated so that the different quantities of plastic which may be present in the rib element 20 relative to the groove element 19 can be compensated for to obtain uniform and desired cooling. The control of cooling may also be obtained by controlling the temperature of the air although for convenience room temperature may be applied with the rate of air flow controlled.

In the event more than two profiles are embodied in the tube 18 additional cooling pipes will be provided, and in the event the profiles are on the exterior surface of the tube the cooling pipes may be provided in the same location.

The principles of the invention may also be utilized in a quench cooling process wherein the tube is cooled by being extruded into a liquid bath. In this process the additional fluid directed at the profiles will be in the form of liquid usually at a cooler temperature than the liquid applied to the rest of the tube so as to obtain increased heat removal.

In operation, the plastic tube 18 is extruded from the die 15 and the film is uniformly cooled through the cooling ring 22. Two or three rings may be used before the profile cooling tubes. Following the cooling ring separate cooling jets are applied to the interlocking rib and groove profiles 19 and 20 by means of the pipes 23 and 24 with the rate of application of cooling air being controlled.

Thus it will be seen that I have provided an improved plastic extruding mechanism and method which meets the objectives and advantages and features above set forth. The arrangement obtains a sufficient solidification of the rib and groove elements before they reach the pinch rolls and obtains an improved product in controlling the orientation of the plastic in a desired manner relative to the greater quantities of plastic present at the location of the rib and groove elements 19 and 20. This in turn allows a greater speed of production.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. In a plastic extruder, the combination comprising:

a die having an annular opening with enlarged profile recesses shaped for forming pressure interlocking rib and groove elements on a tube extruded from the opening, a plastic extruder means forcing plastic through the die, means directing air inside of the tube emerging from the die, pinch rolls spaced from the die flattening the tube, an annular air cooling ring surrounding the tube for cooling the plastic tube, and an auxiliary air jet means positioned after said cooling ring located only at the circumferential location of the rib and groove elements directing a flow of cooling air at said elements for removing heat therefrom.

2. In a plastic extruder, the combination comprising:
a die having an annular opening with enlarged profile recesses shaped for forming pressure interlocking rib and groove elements on a tube extruded from the opening,
a plastic extruder means forcing plastic through the die,
means directing air inside of the tube emerging from the die,
pinch rolls spaced from the die flattening the tube,
an annular air cooling ring surrounding the tube for cooling the plastic tube,
and means directing an auxiliary flow of cooling air at the tube only at the location of the rib and groove elements on the tube.

3. In a plastic extruder, the combination comprising:
an annular extruding die having enlarged profile recess portions shaped for forming pressure interlocking complementary rib and groove elements,
means for directing air into the interior of the tube extruded from the die for forming a tube bubble,
first cooling means annularly cooling the tube,
and second cooling means cooling only the thicker rib and groove elements.

4. In a plastic extruder, the combination comprising:
an annular extruding die having enlarged profile recess portions shaped for forming pressure interlocking complementary rib and groove elements,
means for pressurizing the interior of the tube extruded from the die for forming a tube bubble, and
cooling means directing a concentrated flow of cooling fluid at the tube only at the location of the rib and groove elements.

5. In a plastic extruder, the combination comprising:
an annular extruding die having enlarged profile recess portions shaped for forming pressure interlocking complementary rib and groove elements,
means for directing air into the interior of the tube extruded from the die for forming a tube bubble,
first cooling means annually cooling the tube,
and second cooling means extending longitudinally parallel to the direction of movement of the tube direcing a flow of cooling fluid over a longitudinally elongate area at the location of the rib and groove elements.

6. In a plastic extruder, the combination comprising:
an annular extruding die having enlarged profile recess portions shaped for forming pressure interlocking complementary rib and groove elements,
means for pressurising the interior of the plastic tube extruded from the die for forming a tube bubble,
first cooling means annually cooling the tube,
and an elongated air cooling tube means extending parallel to the plastic tube having a plurality of air jet openings facing the plastic tube directly opposite the location of the rig and groove elements.

7. A plastic extruding mechanism for making film for one piece bags comprising:
an extruder mechanism for extruding a thermoplastic extrudate,
a die on the extruder means having an annular opening with enlarged recess portions shaped to form pressure interlocking rib and groove elements, an annular air ring positioned after the die for cooling the plastic as it emerges from the die opening, means for pressurizing the inside of the plastic tube after it emerges from the die for forming a blown tube bubble, an elongate auxiliary air cooling tube means following the air cooling ring and extending in the direction of travel of the plastic tube located opposite the rib and groove elements and directing auxiliary flow of air to the rib and groove elements cooling them to the temperature of the plastic tube,
means flattening the bubble, pinch rolls shaped to flatten the bubble and receive the rib and groove elements thereon sufficiently solidified by the auxiliary flow of air, and
means for forcing the rib and groove elements together aligning them in opposed relationship and applying a lateral pressure to the outer surface of the closed plastic tube, whereby the rib and groove elements have been solidified and do not stick to each other and may be interlocked.

8. The method of extruding a tube for making bags having integral pressure closing rib and groove elements thereon which comprises the steps,
extruding a tube of thermoplastic from a die having an annular slot with enlarged recesses for forming rib and groove elements, circumferentially cooling the tube and directing air into the interior to form a tube, and additionally cooling only the rib and groove elements to a temperature substantially the same as the temperature of the tube.

9. The method of extruding a tube for making bags having integral pressure closing rib and groove elements thereon which comprises the steps,
extruding a tube of thermoplastic from a die having an annular slot with enlarged recesses for forming rib and groove elements, cooling the tube and pressurizing the inside of the tube to form a tube bubble, and directing an auxiliary flow of cooling fluid at the tube only at the location of the rib and groove elements.

10. The method of extruding a tube for making bags having integral pressure closing rib and groove elements thereon which comprises the steps,
extruding a tube of thermoplastic from a die having an annular slot with enlarged recesses for forming rib and groove elements, cooling the tube with a flow of fluid circumferentially applied and pressurized the inside of the tube to form a tube bubble,
and directing a flow of auxiliary cooling air in the region of the rib and groove elemenets along a longitudinal path parallel to the direction of movement of the tube.

11. In a plastic extruder, the combination comprising:
an annular extruding die having enlarged profile recess portions shaped for forming pressure interlocking complementary rib and groove elements,
means for directing air into the interior of the tube extruded from the die for forming a tube bubble,
first cooling means annularly cooling the tube,
second cooling means cooling the thicker rib and groove elements,
pinch rolls spaced from the die for squeezing the bubble together,
and an annular recess in at least one of said rolls positioned to receive the rib and groove elements.

*12. In a plastic extruder, the combination comprising, an extruding die having a slot for extruding a film of plastic with an enlarged profile portion in the slot shape for forming pressure interlocking complementary rib and groove elements, first cooling means cooling the film, and second cooling means directed only to the particular rib and groove elements.*

*13. In a plastic extruder, the combination comprising, an extruding die having an opening for extruding a film of plastic with an enlarged profile portion, and cooling means for substantially only cooling said enlarged profile portion.*

*14. In a plastic extruder according to claim 13 comprising, second cooling means cooling said film of plastic.*

*15. In a plastic extruder according to claim 14 wherein said second cooling means cools the entire plastic film and the first cooling means cools said enlarged profile portion.*

*16. In a plastic extruder according to claim 15 wherein said first cooling means direct cooling fluid at said enlarged profile portion.*

*17. In a plastic extruder according to claim 13 wherein said means for cooling said enlarged profile portion comprises a pair of jet sources of cooling fluid directed toward said enlarged profile portion.*

*18. In a plastic extruder according to claim 17 wherein said enlarged profile portion comprises a pair of enlarged elements and said pair of jet sources are respectively mounted adjacent said pair of enlarged elements to cool them.*

*19. The method of making plastic formed with an enlarged portion thereon which comprises the steps of,*

*extruding thermoplastic from a die having an enlarged portion for forming an enlarged portion in the plastic, and*

*directing a flow of cooling fluid primarily at the enlarged portion to cool it.*

*20. The method of claim 19 including the step of directing a second flow of cooling fluid at substantially all of the plastic being extruded from said die.*

References Cited

The following references, cited by the Examiner, are of record in the patented file of this patent or the original patent.

UNITED STATES PATENTS

| | | | |
|---|---|---|---|
| 3,038,205 | 6/1962 | Plummer | 264—177 |
| 3,195,184 | 7/1965 | Suec | 264—95 X |
| 2,210,436 | 8/1940 | Weingand et al. | 264—95 X |
| 2,750,631 | 6/1956 | Johnson | 264—95 |
| 2,922,194 | 1/1960 | Lanpard et al. | 18—145 X |
| 3,195,184 | 7/1965 | Svec | 264—95 X |

FOREIGN PATENTS

| | | |
|---|---|---|
| 1,274,521 | 9/1961 | France. |
| 981,736 | 1/1965 | Great Britain. |

ROBERT F. WHITE, Primary Examiner

T. J. CARVIS, Assistant Examiner

U.S. Cl. X.R.

18—12, 14; 264—177, 237